(12) United States Patent
Chen

(10) Patent No.: US 9,020,529 B2
(45) Date of Patent: Apr. 28, 2015

(54) COMPUTER BASED LOCATION IDENTIFICATION USING IMAGES

(71) Applicant: Yahoo! Inc., Sunnyvale, CA (US)

(72) Inventor: Chien-Hung Z. Chen, Taipei (TW)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/936,341

(22) Filed: Jul. 8, 2013

(65) Prior Publication Data

US 2013/0294657 A1    Nov. 7, 2013

Related U.S. Application Data

(63) Continuation of application No. 12/412,238, filed on Mar. 26, 2009, now Pat. No. 8,483,715.

(51) Int. Cl.
*H04W 4/02* (2009.01)
*G06K 9/00* (2006.01)
*G06F 17/30* (2006.01)
*G06T 1/00* (2006.01)
*H04W 4/18* (2009.01)
*H04W 64/00* (2009.01)
*H04L 29/08* (2006.01)

(52) U.S. Cl.
CPC ...... *G06K 9/00637* (2013.01); *G06F 17/30247* (2013.01); *G06F 17/30265* (2013.01); *G06T 1/0021* (2013.01); *H04W 4/02* (2013.01); *H04W 4/185* (2013.01); *H04W 64/00* (2013.01); *H04L 67/18* (2013.01)

(58) Field of Classification Search
USPC ............ 455/456.3, 456.1; 701/300; 709/206; 715/202; 382/106
See application file for complete search history.

(56) References Cited

U.S. PATENT DOCUMENTS

| 2009/0138560 | A1* | 5/2009 | Stahl .............................. 709/206 |
| 2009/0307571 | A1* | 12/2009 | Gowda et al. ................ 715/202 |
| 2012/0155713 | A1* | 6/2012 | Arnaud et al. ................ 382/106 |

* cited by examiner

*Primary Examiner* — Phuoc H Doan
(74) *Attorney, Agent, or Firm* — James J. DeCarlo; Greenberg Traurig, LLP

(57) ABSTRACT

In the field of mobile computing, a user of a mobile device takes a picture of a nearby landmark or building or street and transmits that picture via his device's wireless link to a remote server. The server has the capability of identifying the location from the photo by matching it against publicly available online collections of images, such as Flickr. The server executes a location identification algorithm to match the received photo to those in the collection to determine the actual location of the photo. Typically the images in the collections have metadata, such as textual tags. Upon identifying the most likely location of the received photo from the user, the server transmits back to the user's mobile computing device an indication of the location, such as a textual location description from the tag, a map or directions to a particular location. This is especially useful in a city or dense urban environment and where the mobile computing device does not have GPS capability or its GPS is inoperative.

18 Claims, 4 Drawing Sheets

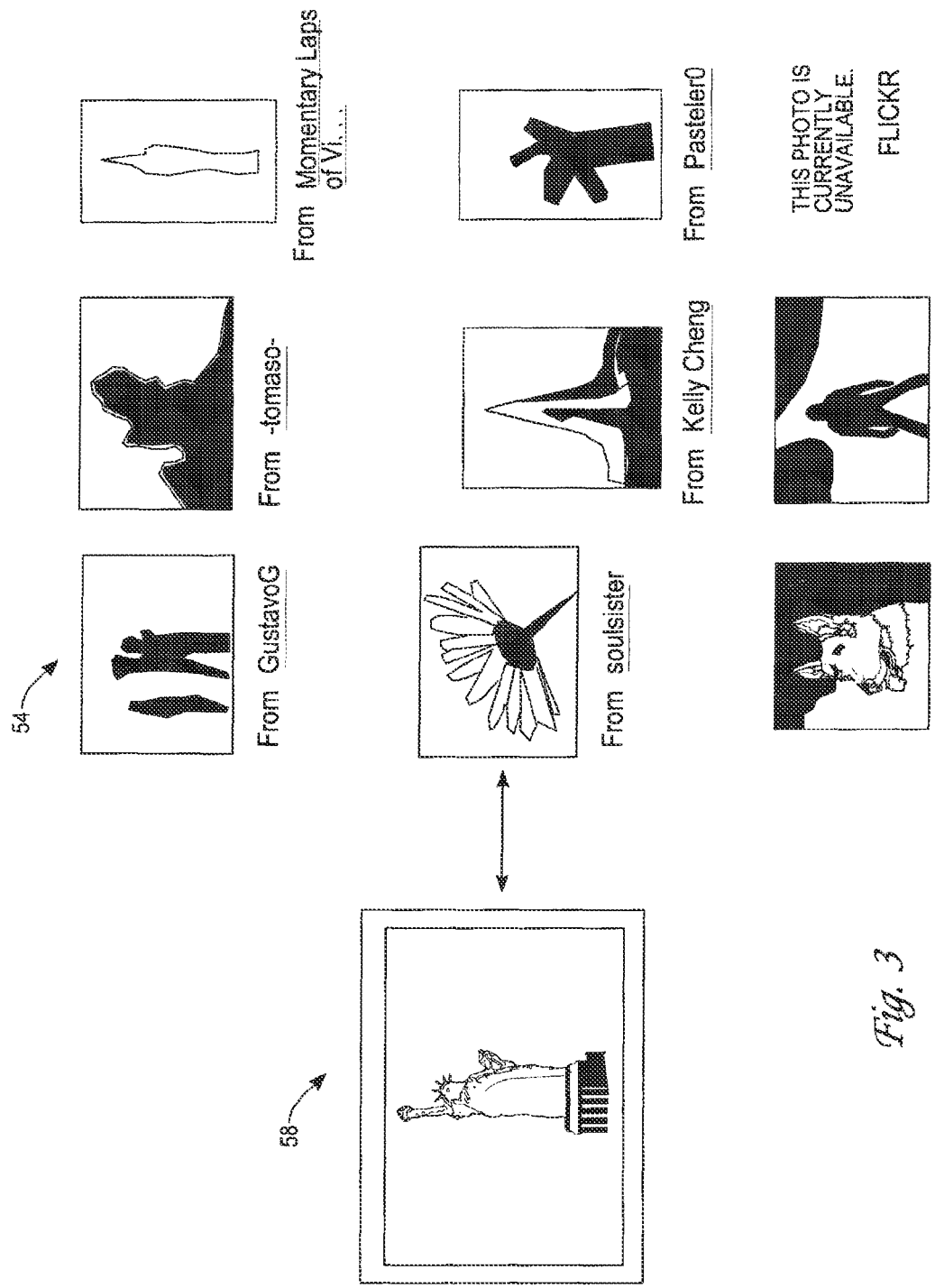

COMPUTER BASED LOCATION IDENTIFICATION USING IMAGES

CROSS REFERENCES TO RELATED APPLICATIONS

This application is a continuation of U.S. Non-Provisional application Ser. No. 12/412,238, filed on Mar. 26, 2009, now U.S. Pat. No. 8,483,715, entitled "Computer based location identification of images" the entirety of which is incorporated herein by reference.

FIELD OF THE INVENTION

This disclosure relates generally to online (e.g., Internet or similar) computer services, and more particularly to location-based online services.

BACKGROUND

In the Internet or "online" field, there are a number of location-based (geolocation) online services. These services relate to geographical location. For instance there is the well known Yahoo! map service, which provides via the Internet maps and route finding directions. This service includes online photos, which are typically aerial photos supplied by Yahoo!. There is also the well known Google Street view photos service, which is similarly geographically based. Most of these require the user to select a particular location or locations and then he is able to download map or pictorial or other information about the location. For instance the user enters as text into his interface (browser) a particular city or street address and obtains back information as to, for instance, local restaurants, hotels, etc. on one's computer or computing device.

However the present disclosure is directed to a different location related problem which is that of a user not sure of his exact location needing to determine where he is using a portable computing device such as a mobile (cellular) telephone, Smart phone, personal digital assistant, portable computer or similar mobile computing device. Currently this can be done if the user's portable computing device is equipped with a GPS (global positioning satellite) system. However GPS has drawbacks. For instance GPS does not function indoors since the radio transmissions to and from the satellites do not penetrate buildings. GPS also does not work well in densely built-up urban areas since buildings block the satellite signals. Also typically GPS requires extra complexity in the mobile computing device. In many cases there is also a monthly charge for GPS services. There are other mobile telephone or wireless location-based devices. However typically their coverage is very limited, for instance, only to certain cities.

Hence there is a need for better and simpler and more sophisticated location detection and indication technology in the mobile computing field.

SUMMARY

The present disclosure is directed to a system for providing location information to a user of a mobile computing device. Typically this is for a mobile computing device that does not have GPS service or perhaps the user is indoors or in another location where his GPS service is not available. It is understood that mobile computing device, as is conventional, includes a wireless connection such as a cellular telephone and/or Internet connection feature and also includes a camera with the capability to take still images (photos) or videos. Of course almost all cellular telephones and Smart phones and PDAs now include such camera capability. Also of course they already possess the capability to transmit such images to other computing devices.

The present inventor has recognized that this simple picture-taking capability, which is widely present and does not require GPS services, can be used to determine the location of the mobile computing device. The technical problem addressed here is to determine one's location using a simple mobile computing device equipped only with a camera and a wireless link, such as cellular telephone or wireless Internet or other, merely by transmitting images to a locating service service without reliance in any other technical location detection features in the mobile computing device.

Hence in accordance with the invention, the camera on the mobile computing device is used for imaging the user's location. Typically this is most useful in an urban or other setting where there are relevant landmarks, such as major buildings, statutes, well known stores or other readily identifiable features in the immediate neighborhood. This is believed to be especially useful in the case where the user knows his approximate location, but not his exact location. For instance this would occur inside a very large building or in an urban neighborhood where the user is not familiar with the street patterns.

The present inventor also has recognized that there are already publicly available online collection (databases) of images, such as photos of various locations, which are generally provided with what is referred to in the field as "tags" or textual identification information. An example of this is the Flickr™ web service. Flickr is an online collection of photos posted by various users and which is publicly available and searchable via the Internet (web), including searching it by the tags or locations. This represents a form of user generated content, which is now available and widely used.

Another example is the well known online Google Street view photos collection. Google has recorded images of most urban areas in the United States by means of video cameras and posted these on a searchable website. Each image has associated with it some sort of textual identification of the location, for instance a street address.

Hence in accordance with the invention the user who is not sure of his exact location, using his mobile computing device, captures an image (takes a picture either still or video) of his surroundings. He then transmits the image to a remote computer web server dedicated to location detection. Details of the server are described below. This is a server of a type not heretofore available and represents most of the internal functionality of the present system. Given the image, which is transmitted by a wireless link, including cellular telephone and/or the Internet or other, to the server, the server then searches relevant online databases (collections) of images. The search may be limited if the user may also indicates textually his approximate location, such as near the Empire State Building in New York City. This added information of course makes the searching much easier. Then using the image (and optionally) the transmitted information, the server searches various databases as described above, such as the Google street level maps, Flickr, other commercially provided databases and/or other user generated content databases. (Flickr is an example of user generated content.) Then after making a match (or at least a correlation, a partial match) between the transmitted image and an image stored in one of the search databases, the server transmits back to the user textual and/or graphic and/or audio information as to his exact location. ("Match" here thus includes a partial match.) The graphical information may include for instance a map showing the determined location.

At the user mobile computing device there is minimal need for any dedicated software to support this process. Typically a conventional web browser or equivalent graphical user interface browser which links the client device to the host server may be adequate. In other cases there is a dedicated client software application (program) resident in the mobile computing device, but this application is relatively simple as set forth below.

Hence in accordance with the invention, there are the user "client" mobile device, the "host" server, the communications link between them, and the method of operating the device and the server. There is also particular software (an "engine") typically located at the server (or servers) which carries out the actual database searching and matching. The databases may be on the same or other servers. The reference here to "database" is not literal, but includes for instance collections of photographs and other images as described above. While typically these are implemented with still photos, it is understood that the engine may also be used to match up video, that is full motion video. For instance a user's video clip of several seconds could be transmitted to the engine and matched to video clips or individual images (where a single video frame is of course the same as a still photo) stored in various online databases. Hence the matching here can generally be between photos and video.

The information transmitted by the server back to the user as to his location may include for instance textual information such as a street address, latitude and longitude, directions to a particular nearby landmarks and/or streets and/or addresses, list of nearby shops, businesses, restaurants, or other location related information in textual form. It also may include a map showing the user's location as determined by the server. Note that the reference to the "tags" here as associated with particular images is also referred to in the field as "metadata". This type of metadata includes information associated with an image, for instance a title of the image, description text, a URL (web universal resource locator), an author, or other information. Also given the nature of searching as described here, in certain embodiments instead of the server merely transmitting a single location back to the user, he may be provided a list of several locations with a ranking of probability if the system for instance cannot determine with any particular degree of certainty exactly where he is.

In other embodiments, the user device may provide to the server technical information giving its approximate location. For instance if he is using a cellular telephone link to the server, the location of the cell he is accessing would give an indication of his approximate location. The same would be the case if he is using a particular wireless Internet connection where the physical location of his Internet node would give an approximation of his location. In certain embodiments, the server uses this technical information to further refine the user's location. However in many cases the user would merely indicate his approximate location by entering it together with his image as a tag associated with the image for instance Empire State Building, New York City. In most cases this would give more accurate location information than would the technical type information such as a wireless node or cellular telephone location.

Note that online image collections such as Flickr include large databases of photos about famous landmarks and tourist related spots each photo having a tag (metadata). This metadata serves as a resource to be used here. Moreover, additional photos or videos of streets and neighborhoods with tags may be taken by the service provider and/or users and provided in yet another for instance dedicated or non-public database. By use of the image or images received from the user mobile computing device, the server engine applies correlation algorithms to obtain a match between the user's image and the database imagery and combines that with search results by using any textual tags entered by the user to identify a location and provide directions to a required destination.

Depending on the processing power available and communication facilities at the server, correlation algorithms on their own working on only images may take too long to identify a particular location. However use of textual tags such as metadata in certain embodiments narrows the search and enables identification of the location of the photo more quickly.

BRIEF DESCRIPTION OF THE DRAWINGS

The present application can be best understood by reference to the following description taken in conjunction with the accompanying drawing figures, in which like parts may be referred to by like numerals:

FIG. 3 shows a set of images available on the Flickr® website.

DETAILED DESCRIPTION

Figure 1:
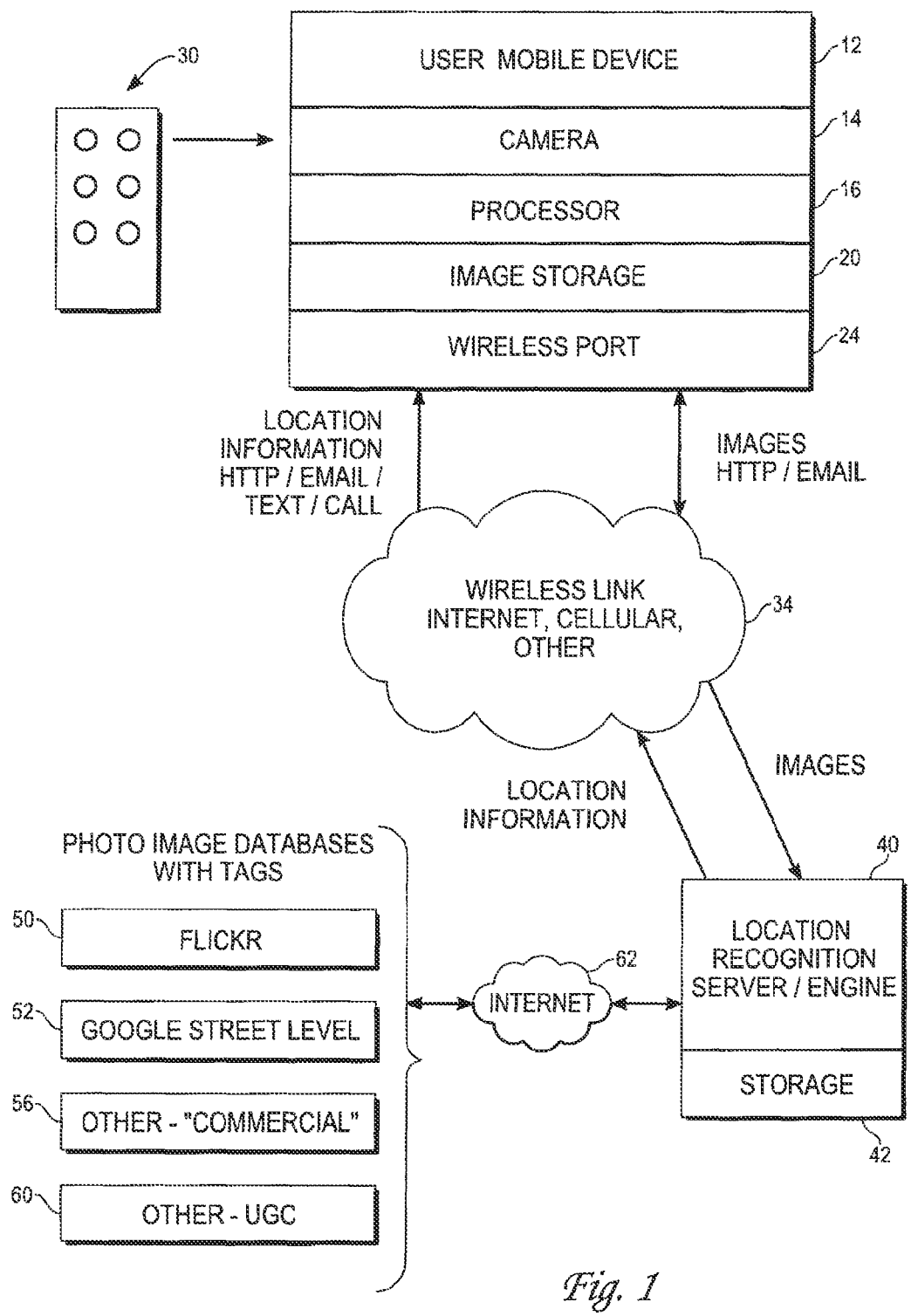
FIG. 1 shows operation of the present system in a block diagram.

As explained above in accordance with the invention, a mobile computing device equipped with a camera is used for identifying the location of and/or obtaining directions for a user of the device. Specifically consider the case where a tourist (user) is visiting a city and is in the approximate neighborhood of a particular landmark or other identifiable location, but is lost. He is likely to be near the landmark, but not know his exact location relative to the landmark. This would especially occur in an urban area, but it is not so limited. One possible solution is to equip the mobile device with a set of photos for all streets in the areas and provide processing power in the mobile device which compares photos of all the streets in the area with a photo which the user takes of his immediate surroundings. However this would require very substantial storage (memory) in the mobile device and considerable processing power. Hence this is not currently practical. But in accordance with the invention, even current mobile computing devices can achieve this capability using an Internet or other wireless link connection to a remote server which includes the processing capability and access to the relevant databases or collections of photos. Typically each such photo has an associated textual tag or metadata. Such databases or collections of photos are publicly available including for instance as described above, the Google Street view photos and user generated photo collections such as Flickr.

For instance Flickr stores many photos of famous (and other) landmarks and tourist spots, including tags indicating the landmark, for instance, Empire State Building, New York City. This is a valuable public web resource which can be searched (both the photos and tags) by a server. Therefore the tourist using his mobile computing device takes a photo from street level and enters into his device relevant landmark information, such as Empire State Building, New York City, as associated text. He then transmits this photo and text to the central server by means of email or an Internet protocol transmission, such as HTTP, or other communications capability available in his mobile computing device.

The server then searches various collections for an exact or close approximation of the photo taken by the user amongst the photos in the various collections to obtain a match there between or an approximate match there between, for instance by applying correlation algorithms. The search includes any textual tags entered by the user to identify the location. It is understood that typically the collections of photos being searched also have a textual tag (metadata) appended to each photo. Given adequate processing power, the correlation algorithm executed by the server on its own on the images themselves may be able to identify a location even without use of the tags. However typically the use of tags will substantially narrow the search and provide a better identification.

For the user the system is very simple. He conventionally takes a photo of his immediate surroundings using his mobile computing device's camera. He connects his mobile computing device to the Internet or other wireless link. He uploads or emails the photo to the server. He receives back a webpage or email or text message indicating his determined location in the form of text and/or a map or other indication. This as indicated above may include other information besides his location, such as directions to a particular landmark or information about nearby shops, restaurants, etc. Such provision of business related information also allows advertising by the cited businesses and hence a revenue source to the operator of the service. In terms of other revenue sources for instance there may be a user charge for use of this overall service (either one time or monthly or both), but typically for such services most revenue is generated by online advertising by relevant businesses or other organizations.

In the field of image recognition there is substantial known technology in what is referred to as "region of interest detection". This is a part of image detection processing. See for instance the following descriptions of methods to correlate images with other images in order to determine locations, see for instance: "Content-Based Image Retrieval Based on ROI Detection and Relevance Feedback" by Qiang Zhou et al, in "Multimedia Tools and Applications", vol. 27, number 2, November 2005, published by Springer, and "an Objectionable Image Detection System Based on Region" by Chi Yon Jeong et al, in "Image Processing, 2006 IEEE International Conference on Image Processing", published by IEEE, 2006. This technology includes image matching by color and shape, which is a well known area of image detection and recognition, see for instance: "Color and Shape Index for Region-Based Image Retrieval" by B. G. Prasad et al, Springer-Verlag 2001 and "Region-Based Shape Matching for Automatic Image Annotation and Query-by-Example" by Eli Saber et al, on "Journal of Visual Communication and Image Representation" vol. 8, no. 1, March 1997.

As described above the metadata or tags of the images include for instance a title of an image, a description, tags which are other text, universal resource locator, an author and other well known metadata-type information, all of which can be used in conjunction with conventional image matching here. Note that the image matching here need not result in only a single result, but may provide several results in which case perhaps only the top result is provided back to the user or he may get a ranking of several reported results, depending on the degree of correlation (matching) achieved.

The term "database" here includes other organized collections of information which may not be a standard database. Also the term "image" here refers to still photos and videos.

FIG. 1 shows operation of a system in accordance with the present invention. User mobile computing device 12 is mostly conventional including as subsystems a camera (still and/or video) 14, a processor 16, image storage 20 and a wireless port 24. Other conventional hardware and software elements such as a display screen, memory for software, telephone features, and Internet support, are not shown as being conventional. In this case, the camera of user mobile device 12 operated by a person ("user") takes a picture of a landmark 30 here depicted as a building, but which could be a street scene, monument, etc. Obviously this landmark is part of the environment and not part of the inventive system. The user mobile device 12 then under control of the user conventionally transmits the captured image of landmark 30 (which has been put into image storage 20 by processor 16) to an external destination using its wireless port 24. This port may be a cellular telephone connection, wireless Internet connection or other. Here this connection is depicted as being HTTP (Internet protocol) and/or an email transmission. It also may be a cellular telephone connection for transmitting a picture. This image is then transmitted via the wireless link 34, which is the Internet, cellular telephone or other network and is wholly conventional, to a host location recognition server (engine) 40. It is understood that wireless link 34 may include wired portions and is not necessarily wholly wireless. Typically the portion between the user mobile device and the nearest fixed site or node is wireless.

Server 40 is a conventional computer server platform, including associated storage for data and server software 42, but executing a match and search capability as described herein. This server platform executes server software in accordance with the invention which performs the image recognition (searching and matching) as described above. This image recognition process is applied against one or several exterior databases (collections of information, not necessarily traditional databases) each typically having text tags identifying the images. These are shown here as being for instance the Flickr website 50, the Google street level photos website 52, other commercial type websites operated by commercial entities such as Google or Yahoo! 56, and other user generated content websites 60. Access to these various databases by the server 40 is via also the Internet 62. Of course this may be a wired or wireless connection.

Upon making a match (partial or full) between the received image from the user mobile device 12 and an image or images found in the various databases 50, 52, 56 and 60, the server 40 transmits the relevant location information (tags and/or other data associated with the found image or modifications thereof) via the wireless link back to the user mobile device. Typically this transmission is via the same type of protocol as the original transmission from the wireless device. This transmission may also be in the form of a text message or a telephone call. In any case this information upon receipt at the wireless port 24 is then provided to the user typically displayed on the screen of the user mobile device (not shown) or perhaps enunciated via a telephone call. If there is a provided screen display, this may include a map showing the determined location as well as the other types of location information referred to above.

The actual matching process carried out by the server 40, as described above, includes the steps of matching the photos received to images on the various databases typically by scanning the databases first using any tags (metadata) and then by actually matching (correlating) the images as discussed above. After this image detection is performed, the metadata of the matched images is extracted, which is typically title, description, a tag, a URL, an author, or other information. Appended to this by the engine may be some additional location related information, including for instance advertising for nearby businesses, and then this extracted metadata together with the appended information is transmitted to the user. As pointed out above, the matching process may include a correlation matching and a ranking. The location information may include in various embodiments, a street address, a map depicting a location, directions to for instance a landmark or major building or street intersection, latitude and longitude, a street name, list of nearby businesses stores, restaurants, etc., or other location related information.

Figure 2B:
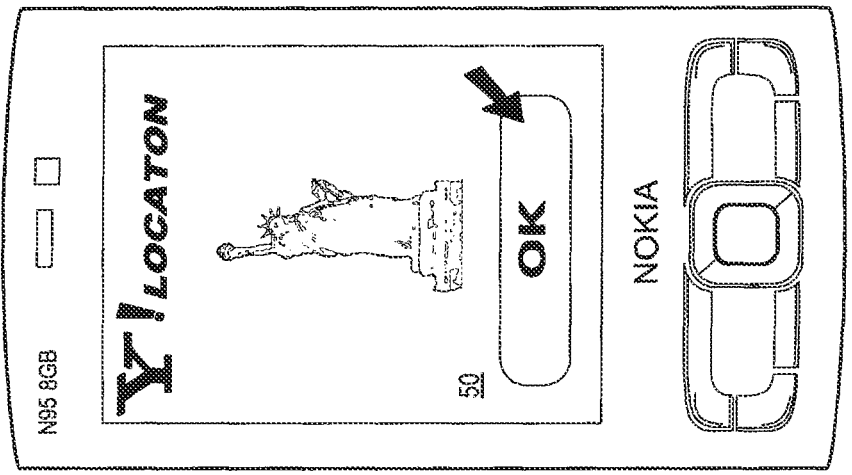
FIGS. 2A, 2B show exemplary user interfaces for the present system.
Figure 2A:
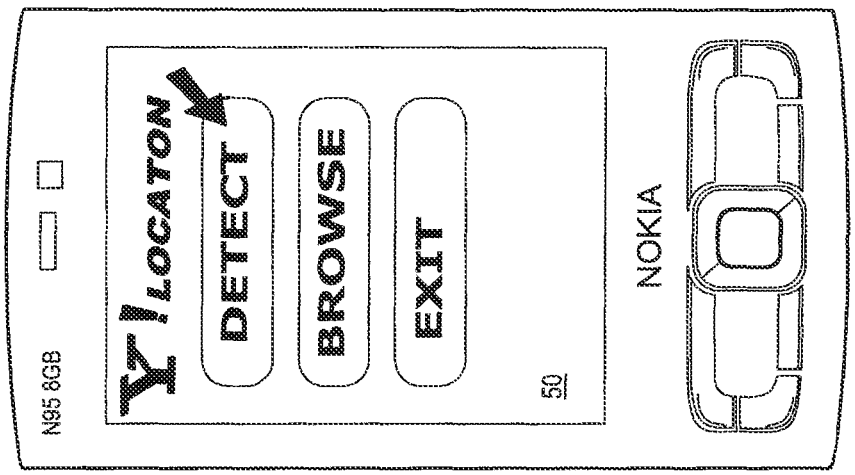

FIGS. 2A and 2B depict examples of screen displays (interfaces) on the user mobile device 12 as provided by a software application (computer program) conventionally resident in the mobile computing device. As shown this is a Nokia brand Smart phone, including a conventional display 50, however this is merely representative of a mobile computing device. In FIG. 2A, device 12 is connected via an Internet type connection with the remote server 40 of FIG. 1. The user then sees on his screen the user interface, in this case indicating as being the "Yahoo! location service". By conventionally manipulating the displayed on screen user controls, the user clicks on the "detect" button on this screen. This puts his user mobile device into the camera mode, which of course is conventional. In the camera mode (FIG. 2B), the user conventionally takes a photo by clicking the "OK" box shown in FIG. 2B. In this case, he is taking a picture of the Statue of Liberty. Of course taking pictures using such a device is routine. In this case, the picture is taken using this particular user interface, although this is illustrative and not limiting. It is understood this particular user interface is shown as an example. In this case, after the user clicks "OK", the mobile device automatically transmits the captured photo to the Yahoo! location server 40 of FIG. 1. In this case the dedicated FIG. 2A, 2B interface has been simplified for ease of use so that the user need not perform any other operations for transmitting the photo or connecting to server 40. In this case the user is not transmitting any metadata as to his approximate location, such as the text "Statue of Liberty". All he transmits in this particular example is the image itself.

In the absence of the dedicated software application, the user can instead in another embodiment conventionally take the picture using the conventional control features of his mobile computing device, then enter his browser, browse to the location service website, select the picture file, and upload it to the website.

As described above, then at the server 40 the server performs its image searching and matching process (algorithm) and matches the captured photo with photos found in the various databases and then extracts the metadata from the matched photo(s), analyses the location keywords, which are the metadata of the matched photos, and then determines the most likely location. After this, as described above the server 40 transmits the resulting location information back to the user. (This step is not shown in FIG. 2A, 2B). The transmitted information may be a text description of location, a map, related photos, or as described above other location information referred to in the field as geo-location information, such as shops, restaurants, etc.

FIG. 3 shows, merely for purposes of illustration, a set of photos from the Flickr collection 54. In this case, this is a set of various photos as indicated provided from various authors as indicated by "From" below some images. In this case, the user's picture 58 shown on the left which is the Statue of Liberty is the one which is to be matched to those in the database 50. As can be seen, none of the displayed pictures actually provide a match in this case. In that case, the search would continue searching other photos or other collections to try to find a better match to image 58.

Note that typically in these collections not only are there images, but each image includes metadata. In this case in collection 54, the only indicated metadata is the author's name. However the metadata may well include a title of the picture, tags, and descriptive material. This textual type data can also be used in the match as described above for instance for location keywords. The best match of the location keywords would be an indication of the correct location of the user provided photo.

In other words, in one embodiment the matching goes through the steps of first capturing the user image, doing the image search, finding many similar images, matching images and sorting through the associated metadata, ranking the keywords, and then providing a most likely location keyword.

As pointed out above in certain embodiments, the user may transmit several photos of one location to provide a more likely or better match of the images. This requires a modification to the matching algorithm, which would be routine.

Any relevant software at the user mobile device may be merely a conventional web browser or graphical user interface browser. In other words, there need not by any dedicated user side software (client). In the depicted embodiment of FIGS. 2A and 2B, a Java or Smart phone software application in the user computing device provides the displayed interface and controls and also may provide a third interface (not shown) for displaying the identification of the location.

Coding the required computer software (in, e.g., the C or C++ computer languages) for the user mobile device (if such software is needed at all) and for the location recognition server 40 would be routine in light of this disclosure. The above description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown above in block diagram form in order not to obscure the description of the invention with unnecessary detail. Thus, the present invention is not intended to be limited to the embodiments shown, but is to be accorded the widest scope consistent with the principles and features disclosed herein.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 4:
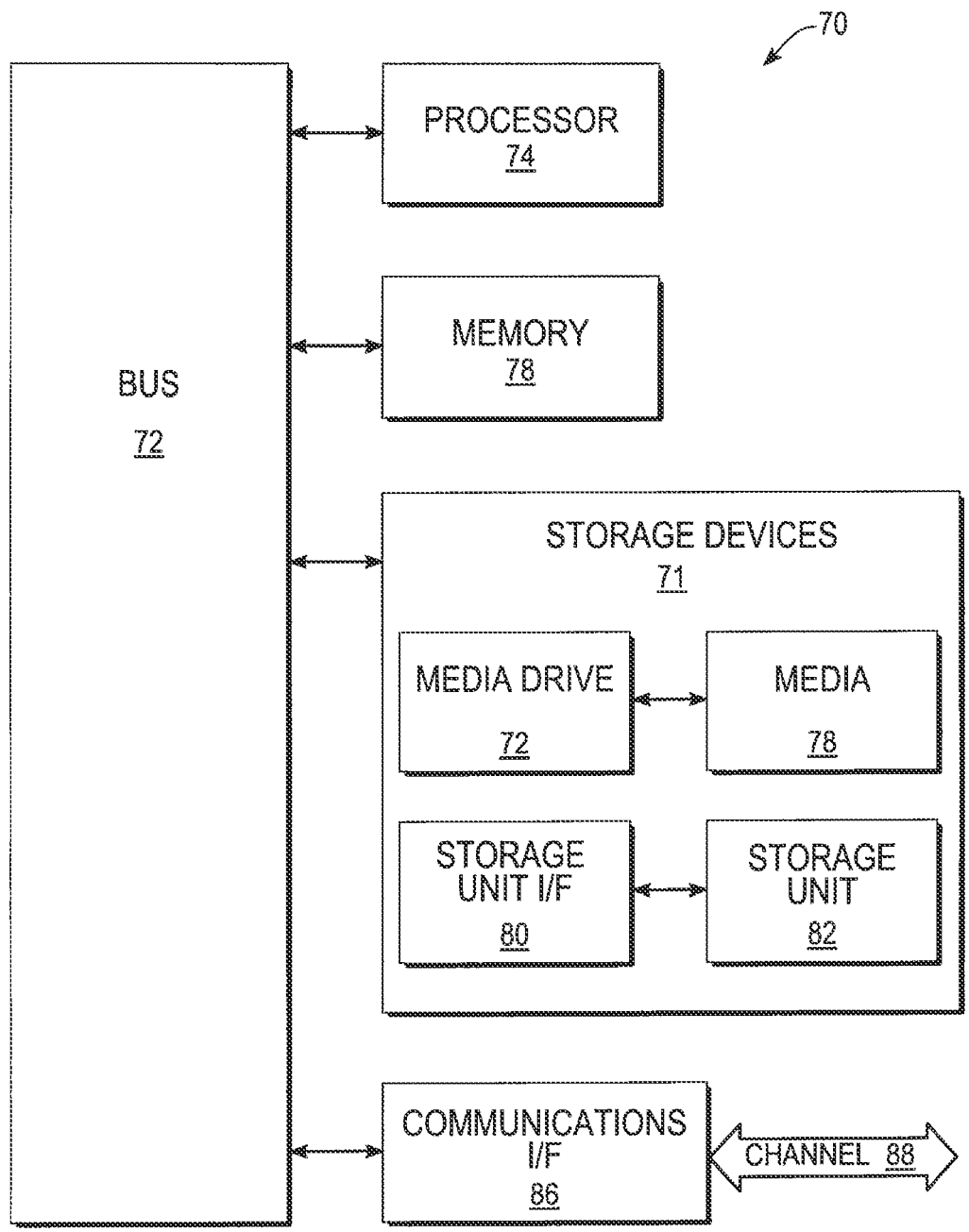
FIG. 4 illustrates a typical computing system that may be employed to implement processing functionality in embodiments of the invention.

FIG. 4 illustrates a typical computing system 70 that may be employed to implement processing functionality in embodiments of the invention such as the server or user mobile device. Computing systems of this type may be used in clients (the user mobile device) and the server (host), for example. Those skilled in the relevant art will also recognize how to implement the invention using other computer systems or architectures. Computing system 70 may represent, for example, a desktop, laptop or notebook computer, handheld computing device (PDA, cell phone, palmtop, etc), mainframe, server, client, or any other type of special or general purpose computing device as may be desirable or appropriate for a given application or environment. Computing system 70 can include one or more processors, such as a processor 74. Processor 74 can be implemented using a general or special purpose processing engine such as, for example, a microprocessor, microcontroller or other control logic. In this example, processor 74 is connected to a bus 72 or other communication medium.

Computing system 70 can also include a main memory 78, such as random access memory (RAM) or other dynamic memory, for storing information and instructions to be executed by processor 74. Main memory 78 also may be used for storing temporary variables or other intermediate information during execution of instructions to be executed by processor 74. Computing system 70 may likewise include a read only memory ("ROM") or other static storage device coupled to bus 72 for storing static information and instructions for processor 74.

The computing system 70 may also include information storage system 71, which may include, for example, a media drive 72 and a removable storage interface 80. The media drive 72 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 78, may include, for example, a hard disk, floppy disk, magnetic tape, optical disk, CD or DVD, or other fixed or removable medium that is read by and written to by media drive 72. As these examples illustrate, the storage media 78 may include a computer-readable storage medium having stored therein particular computer software or data.

In alternative embodiments, information storage system 71 may include other similar components for allowing computer programs or other instructions or data to be loaded into computing system 70. Such components may include, for example, a removable storage unit 82 and an interface 80, such as a program cartridge and cartridge interface, a removable memory (for example, a flash memory or other removable memory module) and memory slot, and other removable storage units 82 and interfaces 80 that allow software and data to be transferred from the removable storage unit 78 to computing system 70.

Computing system 70 can also include a communications interface 86. Communications interface 86 can be used to allow software and data to be transferred between computing system 70 and external devices. Examples of communications interface 86 can include a modem, a network interface (such as an Ethernet or other NIC card), a communications port (such as for example, a USB port), a PCMCIA slot and card, etc. Software and data transferred via communications interface 86 are in the form of signals which can be electronic, electromagnetic, optical or other signals capable of being received by communications interface 86. These signals are provided to communications interface 86 via a channel 88. This channel 88 may carry signals and may be implemented using a wireless medium, wire or cable, fiber optics, or other communications medium. Some examples of a channel include a phone line, a cellular phone link, an RF link, a network interface, a local or wide area network, and other communications channels In this disclosure, the terms "computer program product," "computer-readable medium" and the like may be used generally to refer to media such as, for example, memory 78, storage device 78, or storage unit 82. These and other forms of computer-readable media may be involved in storing one or more instructions for use by processor 74, to cause the processor to perform specified operations. Such instructions, generally referred to as "computer program code" (which may be grouped in the form of computer programs or other groupings), when executed, enable the computing system 70 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 70 using, for example, removable storage drive 84, drive 72 or communications interface 86. The control logic (in this example, software instructions or computer program code), when executed by the processor 74, causes the processor 74 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims Additionally, although a feature may appear to be described in connection with particular embodiments, one skilled in the art would recognize that various features of the described embodiments may be combined in accordance with the invention.

Moreover, it will be appreciated that various modifications and alterations may be made by those skilled in the art without departing from the spirit and scope of the invention. The invention is not to be limited by the foregoing illustrative details, but is to be defined according to the claims.

Although only certain exemplary embodiments have been described in detail above, those skilled in the art will readily appreciate that many modifications are possible in the exemplary embodiments without materially departing from the novel teachings and advantages of this invention. Accordingly, all such modifications are intended to be included within the scope of this invention as defined by the appended claims.

The invention claimed is:

1. A method comprising:
receiving, by a processor, an image of a location captured by a remote mobile computing device;
accessing, by the processor, at least one database comprising a plurality of images, the plurality of images having tags denoting respective locations associated with the images;
scanning, by the processor, the at least one database based on the tags of the plurality of images;
matching, by the processor, the images in the at least one database to the received image via employing a correlating algorithm that determines locations;
identifying, by the processor, at least one other matching image from the plurality of images, the at least one other matching image comprising the location captured by the received image;
extracting, by the processor, at least one tag denoting a location associated with the at least one other matching image; and
transmitting, by the processor via a wireless link, information associated with the extracted tag to the remote mobile computing device.

2. The method of claim 1, further comprising:
receiving, by the processor, a textual tag from the remote mobile computing device.

3. The method of claim 2, wherein identifying at least one other matching image further comprises:
scanning, by the processor, the at least one database based on the received textual tag;
identifying, by the processor, a subset of the plurality of images that have tags matching the received textual tag.

4. The method of claim 2, further comprising:
transmitting, by the processor, directions to a required destination based on the received textual tag.

5. The method of claim 1, identifying at least one matching image further comprising:
identifying, by the processor, multiple images of the plurality of images, each of the multiple images associated with different locations when the location in the received image cannot be accurately determined;
ranking, by the processor, the different locations based on respective probabilities of match with the location.

6. The method of claim 5, further comprising:
transmitting, by the processor, a ranked list of the different locations to the remote mobile computing device.

7. The method of claim 1, further comprising:
transmitting, by the processor to the remote mobile computing device, additional location information comprising a map or text associated with the extracted tag.

8. The method of claim 1, further comprising:
identifying, by the processor, an approximate location of the remote computing device via location of a cell or Internet node employed by the remote mobile device to communicate with the processor.

9. The method of claim 1, further comprising:
providing, by the processor, business related information with the extracted tag to the remote mobile computing device.

10. A computing system comprising:
at least one processor;
a storage medium for tangibly storing thereon program logic for execution by the processor, the program logic comprising:
image receiving logic, executed by the processor, for receiving an image of a location captured by a remote mobile computing device;
images accessing logic, executed by the processor, for accessing at least one database comprising a plurality of images, the plurality of images having tags denoting respective locations associated with the images;
match identifying logic, executed by the processor, for identifying at least one other matching image from the plurality of images, the at least one other matching image comprising the location captured by the received image;
tag extracting logic, executed by the processor, for extracting at least one tag denoting a location associated with the at least one other matching image; and
information transmitting logic, executed by the processor via a wireless link, for transmitting the extracted tag to the remote mobile computing device.

11. The system of claim 10, wherein the match identifying logic further comprises:
scanning logic, executed by the processor, for scanning the at least one database based on the tags of the plurality of images; and
image matching logic, executed by the processor, for matching the images in the at least one database to the received image via employing a correlating algorithm.

12. The system of claim 10, further comprising:
tag receiving logic, by the processor, a textual tag from the remote mobile computing device.

13. The system of claim 12, wherein the identifying logic further comprises:
scanning logic, executed by the processor, for scanning the at least one database based on the received textual tag and identifying a subset of the plurality of images that have tags matching the received textual tag.

14. The system of claim 12, further comprising:
directions transmitting logic, executed by the processor, for transmitting directions to a required destination based on the received textual tag.

15. A computer readable storage medium, comprising processor-executable instructions for:
receiving an image of a location captured by a remote mobile computing device;
accessing at least one database comprising a plurality of images, the plurality of images having tags denoting respective locations associated with the images;
scanning the at least one database based on the tags of the plurality of images; and
matching the images in the at least one database to the received image via employing a correlating algorithm that determines locations;
identifying at least one other matching image from the plurality of images, the at least one other matching image comprising the location captured by the received image;
extracting at least one tag denoting a location associated with the at least one other matching image; and
transmitting information associated with the extracted tag to the remote mobile computing device.

16. The computer readable storage medium of claim 15, further comprising processor-executable instructions for:
receiving a textual tag from the remote mobile computing device.

17. The computer readable storage medium of claim 16, further comprising processor-executable instructions for:
scanning the at least one database based on the received textual tag;

identifying a subset of the plurality of images that have tags matching the received textual tag.

18. The computer readable storage medium of claim 16, further comprising processor-executable instructions for:
transmitting directions to a required destination based on the received textual tag.

* * * * *